US012683537B2

(12) United States Patent
Miller et al.

(10) Patent No.: US 12,683,537 B2
(45) Date of Patent: Jul. 14, 2026

(54) PORTABLE SOLAR SYSTEMS

(71) Applicant: ZampTech Sub LLC, Bend, OR (US)

(72) Inventors: Conor Miller, Bend, OR (US); Brian Butcher, Bend, OR (US); Josh Burke, Bend, OR (US)

(73) Assignee: ZampTech Sub LLC, Bend, OR (US)

( * ) Notice: Subject to any disclaimer, the term of this patent is extended or adjusted under 35 U.S.C. 154(b) by 0 days.

(21) Appl. No.: 18/301,709

(22) Filed: Apr. 17, 2023

(65) Prior Publication Data

US 2023/0275538 A1 Aug. 31, 2023

Related U.S. Application Data

(62) Division of application No. 17/529,906, filed on Nov. 18, 2021.

(60) Provisional application No. 63/116,098, filed on Nov. 19, 2020.

(51) Int. Cl.
*H02S 10/40* (2014.01)
*H02S 30/20* (2014.01)
*H02S 40/30* (2014.01)

(52) U.S. Cl.
CPC .............. *H02S 10/40* (2014.12); *H02S 30/20* (2014.12); *H02S 40/30* (2014.12)

(58) Field of Classification Search
None
See application file for complete search history.

(56) References Cited

U.S. PATENT DOCUMENTS

| | | | | |
|---|---|---|---|---|
| 2006/0037682 A1* | 2/2006 | Reiter | .................... | A45C 13/26 |
| | | | | 150/107 |
| 2016/0173022 A1* | 6/2016 | Hirose | .................. | F24S 25/636 |
| | | | | 136/251 |
| 2020/0295700 A1* | 9/2020 | Vaidyanathan | ......... | H02S 20/23 |

FOREIGN PATENT DOCUMENTS

| | | | | |
|---|---|---|---|---|
| CN | 207504810 U | * | 6/2018 | |
| CN | 111327257 A | * | 6/2020 | |

OTHER PUBLICATIONS

Zamp Solar ("After ample months of Field Testing, Exploring, Crafting, and Refining, Zamp Solar is proud to launch something special to the market in the near future." Nov. 13, 2020 <URL https://www.facebook.com/zampsolar/videos/ 2973208982906705>) (Year: 2020).*

* cited by examiner

*Primary Examiner* — Dustin Q Dam

(74) *Attorney, Agent, or Firm* — PATTERSON + SHERIDAN, LLP

(57) ABSTRACT

In an embodiment, a portable solar system includes a solar panel assembly and a case. The solar panel assembly includes a frame at least partially surrounding the solar panel assembly. The case includes a case front and a case back. The case back is movably attached to the case front at a first hinge. The frame of the solar panel assembly is attached to the case back on an interior side of the case. The case back includes a storage pocket that is accessible from an exterior side of the case.

18 Claims, 11 Drawing Sheets

PORTABLE SOLAR SYSTEMS

CROSS-REFERENCE TO RELATED APPLICATIONS

This application is a divisional of U.S. application Ser. No. 17/529,906, filed Nov. 18, 2021, which claims priority from U.S. Provisional Application No. 63/116,098, filed Nov. 19, 2020. U.S. application Ser. No. 17/529,906 and U.S. Provisional Application No. 63/116,098 are hereby incorporated by reference.

BACKGROUND

Technical Field

The present disclosure relates generally to off-grid power generation and more particularly, but not by way of limitation, to portable solar systems.

History of Related Art

This section provides background information to facilitate a better understanding of the various aspects of the disclosure. It should be understood that the statements in this section of this document are to be read in this light, and not as admissions of prior art.

Off-grid electrification refers to systems that provide electrical power to individuals without the support of a remote electric infrastructure. In many cases, an off-grid electrical system is a stand-alone power system that generates electricity through various means, such as solar and wind power that is stored and used locally. Off-grid electrical systems, such as solar panels find particular utility in activities requiring mobility such as camping and remote living as well as in conjunction with vehicles such as military and emergency response vehicles, buses, trucking, public transportation, heavy equipment, towable machinery, marine vehicles and recreational vehicles ("RVs"). One aspect that must be considered in the installation of solar panels in mobile applications is that air flow across the panel as well as dynamic pressures resulting from air resistance of the panel. Additionally, many mobile applications have size, mounting structure, and aesthetic constraints that must be considered in design of the system.

SUMMARY

In an embodiment, a portable solar system includes a solar panel assembly and a case. The solar panel assembly includes a frame at least partially surrounding the solar panel assembly. The case includes a case front and a case back. The case back is movably attached to the case front at a first hinge. The frame of the solar panel assembly is attached to the case back on an interior side of the case. The case back includes a storage pocket that is accessible from an exterior side of the case.

In an embodiment, a case attachment assembly for a solar panel includes a frame member, a T-nut, and a case. The frame member has a channel formed therein. The T-nut is received into and slidably disposed within the channel. The case is coupled to the T-nut.

In an embodiment, a case also includes a case front and a case back. The case back is movably attached to the case front at a first hinge and has a plurality of apertures therein. The case back is configured to attach to a frame of a solar panel assembly via the plurality of apertures. The case back includes a storage pocket that is accessible from an exterior side of the case.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1A:
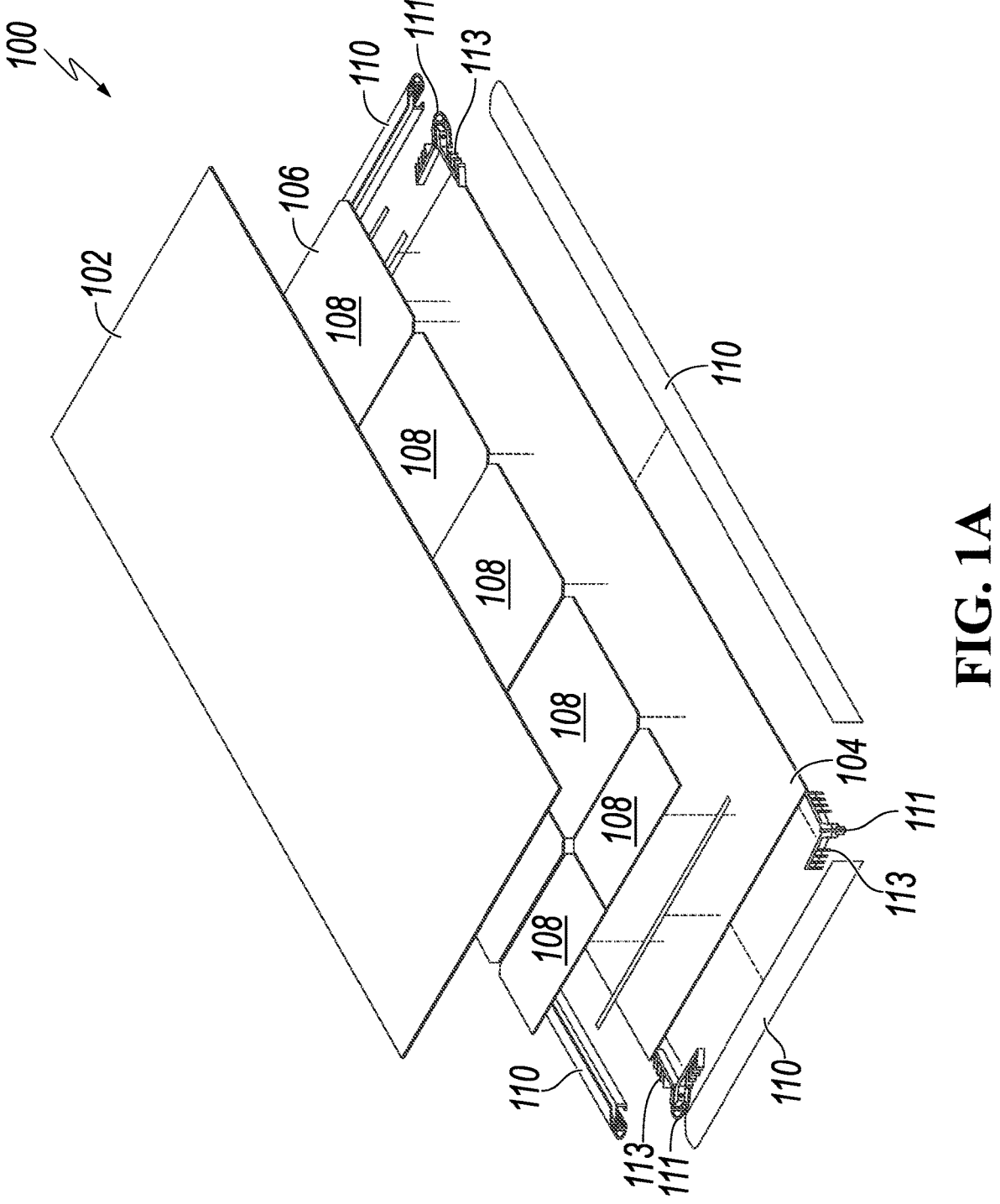
FIG. 1A is an exploded top perspective view of a solar panel assembly.

Various embodiments will now be described more fully with reference to the accompanying drawings. The disclosure may, however, be embodied in many different forms and should not be construed as limited to the embodiments set forth herein.

Off-grid electrical systems, and particularly off-grid solar systems, find particular utility in connection with vehicles such as, for example, military and emergency response vehicles, buses, trucking, public transportation, heavy equipment, towable machinery, marine vehicles, and RVs. In such applications, a solar panel or an array of solar panels is secured, for example, to a roof of the vehicle in such a way as to be exposed to solar energy. It is beneficial for the solar panels to have an aerodynamic profile in order to reduce wind resistance against the solar panels during periods when the vehicle is in motion. Such an arrangement as well as the placement, size, and profile, can reduce the potential for damage to the solar panels and may improve a fuel efficiency of the vehicle.

Additionally, folding, or "briefcase" style portable solar products use standard heavy glass panels. Larger output products, such as a 230-Watt kit that use two 115-Watt solar panels, are very heavy, difficult to store, and difficult to deploy. They are also difficult to build and overly expensive.

The present disclosure describes examples of leveraging the various attributes of non-hinged solar panels for an integrated case for portable solar products. In certain embodiments, the integrated case described herein provides for a much lighter-weight, easy to store, and expandable system. For example, instead of one large 200-watt portable, two 100-watt portables may be used together to achieve the same output but in an easier to store and easier to deploy product. Advantageously, in various embodiments, a universal interconnect may be used to make the wiring components of the system interchangeable and re-configurable.

In various embodiments, an integrated case as described herein not only protects the solar panel in storage or transit, but also deploys quickly and becomes an adjustable stand as well as storage for a charge controller and wiring harness accessories. The case can be, for example, a combination of multiple hard-durometer molded ethylene vinyl acetate (EVA) panels, laminated and combined with various other materials (e.g., Hypalon, 1000D Mesh, Textured PU) externally trimmed and bound. In various embodiments, the case includes a large padded and zippered storage pocket that includes a clear window for weather-resistant viewing of a magnetically mounted charge controller while deployed. In certain cases, the use of ATP interconnects in combination with the magnetically mounted charge controller means that the portable can become "un-regulated" by removing the charge controller quickly and reconnecting the wire harness. Advantageously, in certain embodiments, this makes the series of size options and system configurations expandable, and customizable. In various embodiments, leveraging non-hinged panels and an integrated case in the fashion described herein can dramatically simplify product assembly and enable combination kits of multiple units wired together for expansion, in contrast to the non-expandable hinged panel design.

Figure 1B:
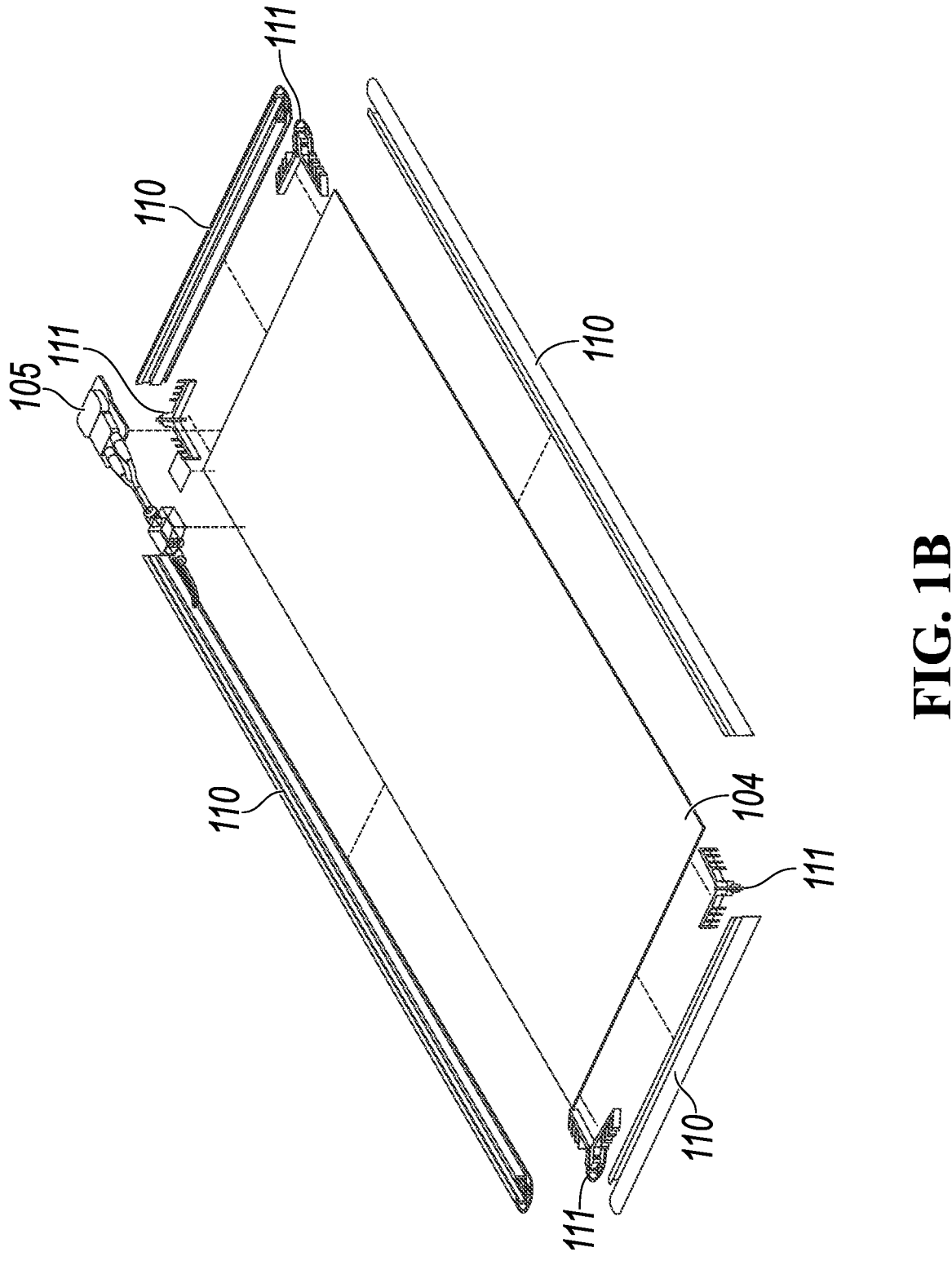
FIG. 1B is an exploded bottom perspective view of the solar panel assembly of FIG. 1A.

FIG. 1A is an exploded top perspective view of a solar panel assembly 100. FIG. 1B is an exploded bottom perspective view of a solar panel assembly 100. Referring to FIGS. 1A and 1B collectively, the solar panel assembly 100 includes an optical layer 102 and a substrate 104. A solar array 106 is disposed between the optical layer 102 and the substrate 104. The solar array 106 includes photovoltaic cells 108 that are arranged on the substrate 104. The solar array 106, the optical layer 102, and the substrate 104 are bounded, or surrounded, by frame members 110. In various embodiments the frame members 110 are coupled to each other at approximate right angles via corner members 111. In various embodiments, the corner members 111 include ribs 113 that are received into the frame members 110 and produce a friction fit between the corner members 111 and the frame members 110. In various embodiments, the optical layer 102 is constructed of a substantially transparent material such as, for example, low-iron tempered float glass. In other embodiments, the optical layer 102 may be constructed of an impact-resistant material such as, for example, polycarbonate. The optical layer 102 is substantially transparent so as to facilitate transmission of solar energy to the solar array underlying the optical layer and may, in some embodiments, be coated or embedded with an anti-reflective material. In various embodiments, the optical layer 102 has a minimum thickness of, for example, approximately 1 mm and a maximum thickness of, for example, approximately 4 mm.

The solar array 106 includes at least one photovoltaic cell 108. In various embodiments, the solar array 106 may include a plurality of photovoltaic cells 108. In various embodiments, the photovoltaic cells 108 may be, for example, silicon solar cells, monocrystalline silicon solar cells, polycrystalline solar cells, thin-film solar cells, amorphous silicon solar cells, cadmium solar cells, copper indium gallium selenide solar cells, or any other type of photovoltaic cells that operate on the photovoltaic effect. During operation, the solar array 106 receives the solar energy through the optical layer 102 and converts the solar energy into an electrical current. The electrical current is transmitted to a power transformer 105 which is disposed on a rear face of the substrate 104 and electrically coupled to the solar array 106. The solar array 106 is coupled to the substrate 104 via, for example, a thermosetting polymer such as, for example, epoxy resins, phenolic resins, unsaturated polyester resins, polyurethane resins, silicones, vinyl esters, or any other type of thermosetting polymer adhesive. In various embodiments, the substrate 104 is a flexible, high-temperature polymer such as, for example, ethylene-vinyl acetate ("EVA") or polyolefin elastomer ("POE").

Figure 2:
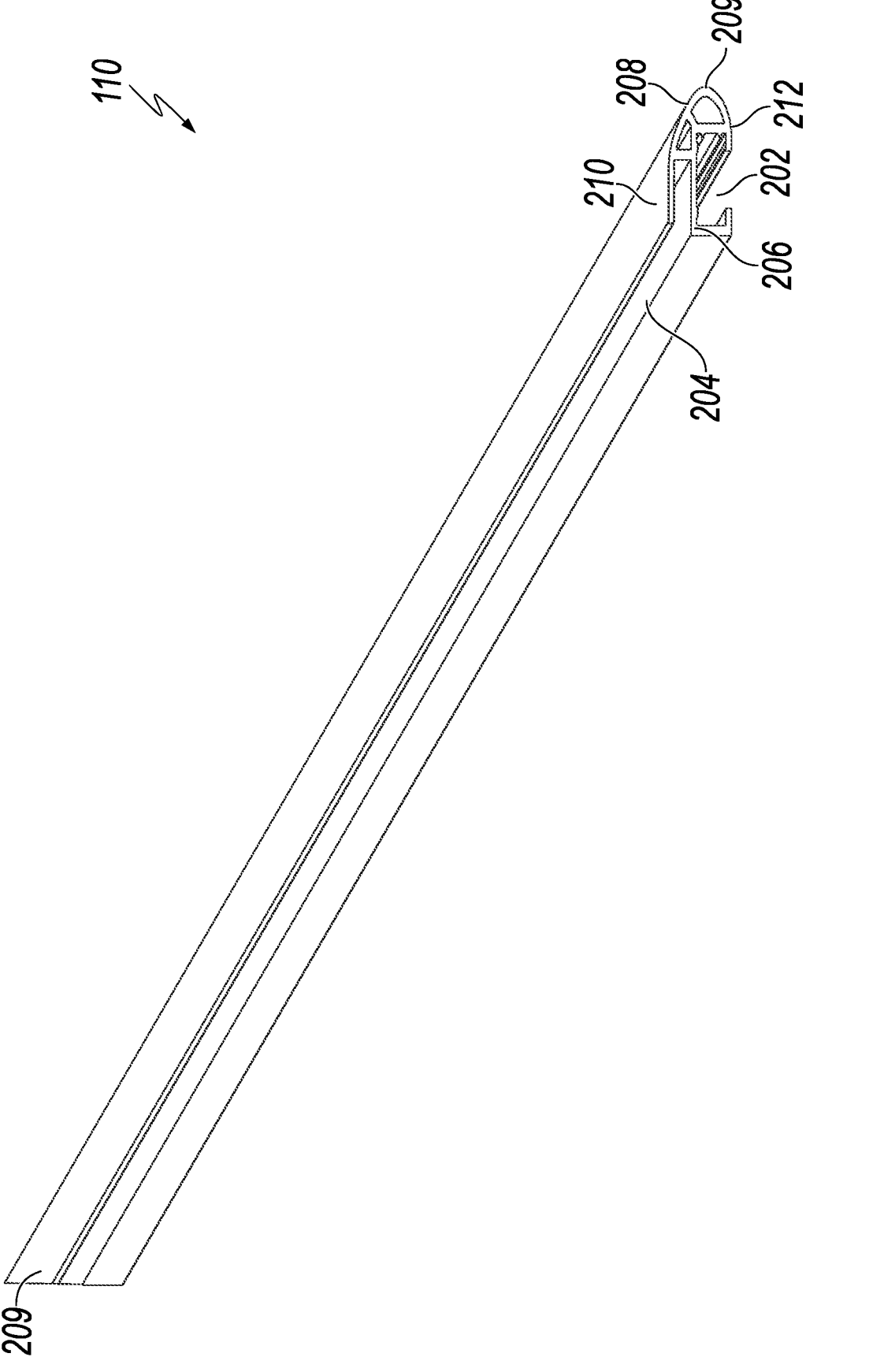
FIG. 2 is a perspective view of a support rail for use with a solar panel assembly.
Figure 3:
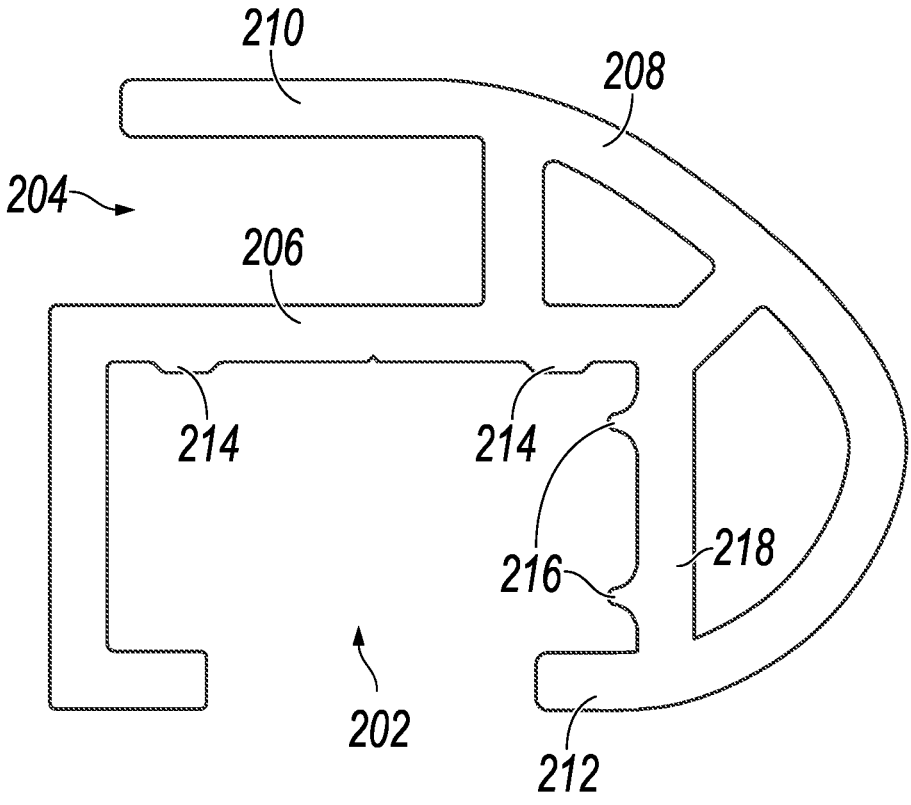
FIG. 3 is an end view of the support rail of FIG. 2.

FIG. 2 is a perspective view of a frame member 110 for use with the solar panel assembly 100. FIG. 3 is an end view of the frame member. The frame member 110 includes a channel 202 formed therein. Vertical ridges 214 are formed from an upper member 206 of the channel 202 towards an interior of the channel 202. Horizontal ridges 216 are formed on a side member 218 of the channel 202 and extend towards an interior of the channel 202. A notch 204 is formed on an upper member 206 of the channel 202. An arcuate member 208 couples a top surface 210 of the notch 204 with a lower aspect 212 of the channel 202. In various embodiments, the arcuate member 208 forms a curved and aerodynamic outer edge of the frame member 110, which, for example, reduces wind resistance and facilitates placement of the solar panel assembly 100 on an exterior of, for example, a motor vehicle. Wind resistance can not only reduce the fuel efficiency of the vehicle but also impart dynamic pressures and stresses to the solar panel assembly 100 and particularly to the frame members 110.

The arcuate member 208 includes a curved, a generally curved, or a substantially curved section of the cross section of the frame member 110. Additionally, the arcuate member 208 may, in various embodiments, include any angle or combination of angles to form a suitable radius and cross-sectional shape. By way of example, in the embodiment illustrated in FIGS. 2-3, the arcuate member 208 curves away from an interior of the solar panel assembly 100. In other embodiments, the arcuate member 208 may be, for example, concave or convex relative to the center of the solar panel assembly 100. In various embodiments, the arcuate member 208 may include any combination of radii such as, for example, approximately 0.1 inches to approximately 1.5 inches.

Still referring to FIGS. 2-3, when assembled, the optical layer 102, the substrate 104, and the solar array 106 are received into the notch 204. In various embodiments, an interference fit is created between a laminated assembly of the substrate 104, the solar array 106, and the optical layer 102 and the notch such that the laminated assembly of the substrate 104, the solar array 106, and the optical layer 102 is retained in the notch 204 via friction. In various embodiments, the frame member 110 has a height of, for example, 0.75 inches; however, in other embodiments, heights of greater than or less than 0.75 inches may be utilized. The frame members 110 are formed with mitered ends 209 so as to facilitate placement of the frame members 110 around the assembly of the optical layer 102, the substrate 104, and the solar array 106 in a manner that creates smooth aerodynamic corners.

Figure 4A:
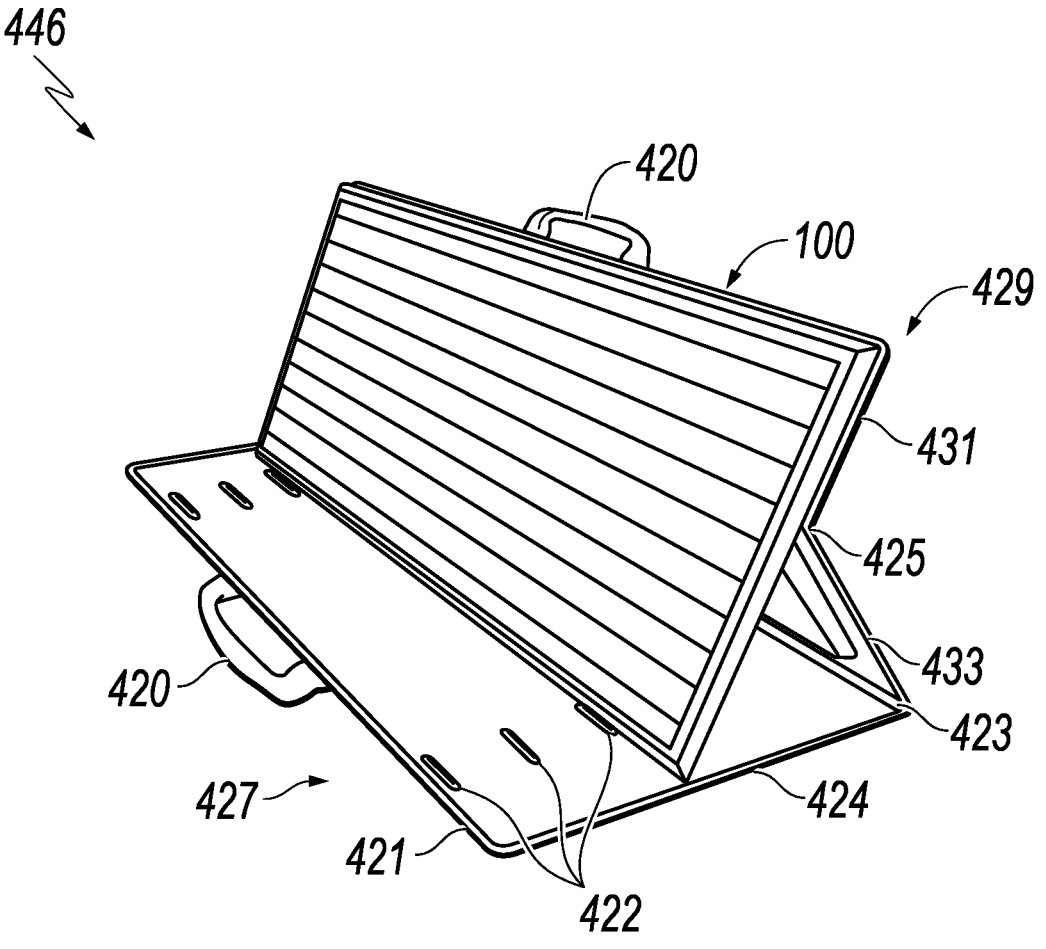
FIG. 4A is a front perspective view of a portable solar system in an open, or deployed, configuration.
Figure 4B:
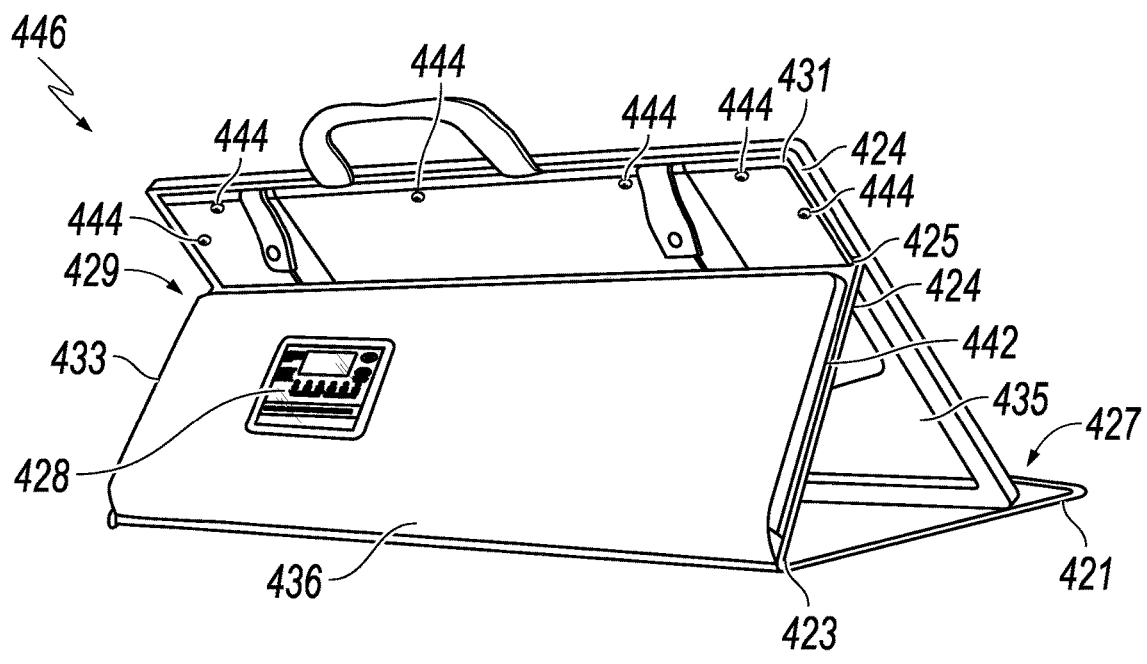
FIG. 4B is a rear perspective view of the portable solar system of FIG. 4A with a closed pocket door.
Figure 4C:
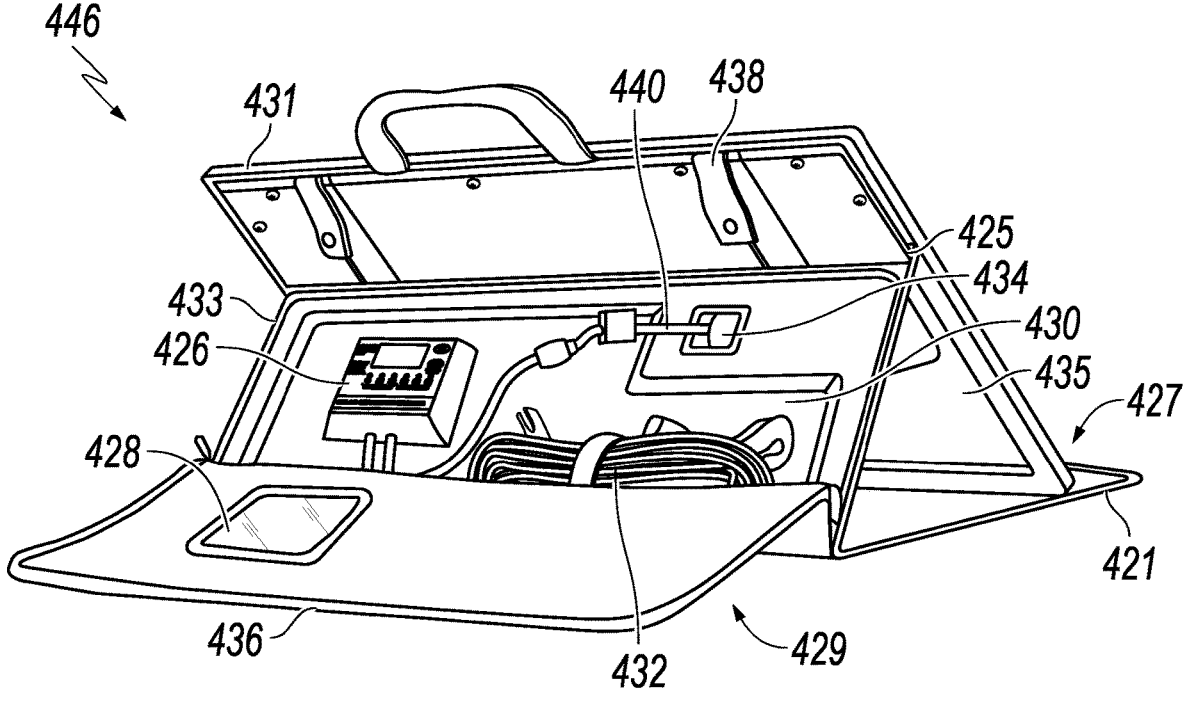
FIG. 4C is a rear perspective view of the portable solar system of FIG. 4A with an open pocket door.

FIGS. 4A-C illustrate a portable solar system 446 for the solar panel assembly 100 in an open, or deployed, configuration. FIG. 4A is a front perspective view of the portable solar system 446. FIGS. 4B and 4C are rear perspective views of the portable solar system 446. FIGS. 4A-C will be described collectively herein.

The portable solar system 446 includes the solar panel assembly 100 and a case 421. The case 421 includes a case front 427 and a case back 429 movably attached or coupled at, and separated by, a hinge 423. In a typical embodiment, the case 421 folds at the hinge 423 for purposes of opening or closing the case 421. The case 421 includes two bale handles 420, one of which is disposed at or near the top of the case front 427 and the other of which is disposed at or near the top of the case back 429. The bale handles 420 can be magnetic such that they attract each other and symmetrically clasp together when the case 421 is closed.

The case back 429, which is typically padded, includes a panel attachment section 431 and a storage section 433 movably attached or coupled at, and separated by, a hinge 425. The solar panel assembly 100 is attached to an interior side of the panel attachment section 431 via a plurality of fasteners 444. In various embodiments, the fasteners 444 may each be a threaded fastener such as, for example, a screw or bolt. However, in other embodiments, the fasteners 444 may each be a non-threaded fastener such as, for example, a rivet, a friction pin, or other fastener. The case back 429 can further include, for example, web/buckle closures 438 that are usable for securing the case back 429 relative to the case front 427 when the case 421 is in its closed configuration.

Still referring to the case back 429, as shown in FIG. 4C, an interior of the storage section 433 includes a storage pocket 430 and a neoprene port 434. In certain embodiments, the storage pocket 430 fits in negative space 435 on a backside of the solar panel assembly 100 and is accessible from an exterior side of the case 421. In various embodiments, the storage pocket 430 can store portable system electronics and components such as a solar charge controller 426, a battery cord 432 that connects the solar charge controller 426 to a battery, and/or other components. In various embodiments, the solar charge controller 426 is magnetically mounted inside the storage pocket 430. In the illustrated embodiment, a panel cord 440 passes through the neoprene port 434 to connect the solar charge controller 426 and the solar panel assembly 100.

Still referring to the case back 429, the storage section 433 is enclosed or covered by a pocket door 436 on an exterior side of the case 421. The pocket door 436 can open or close via, for example, a pocket zipper 442, thereby configurably enclosing or exposing the interior of the storage section 433 from an exterior side of the case 421. In the illustrated embodiment, the pocket door 436 includes a window 428 that provides visibility to the solar charge controller 426. The window 428 can serve as a transparent protective cover, for example, that is constructed of clear plastic or other transparent material. As shown in FIG. 4B, when the pocket door 436 is closed, the window 428 aligns with, and provides visibility to, the solar charge controller 426. As shown in FIG. 4C, when the pocket door 436 is open, the interior of the storage section 433 is exposed for purposes of accessing, for example, the solar charge controller 426 and the storage pocket 430.

The case front 427 includes angle seats 422 on an interior side thereof. In a typical embodiment, the angle seats 422 enable the case 421 to operate as a stand for the solar panel assembly 100, such that the solar panel assembly 100 can be positioned at a desired angle, for example, relative to the sun. In a typical embodiment, the case back 429, which has the solar panel assembly 100 attached to the panel attachment section 431 thereof as described previously, folds relative to the hinge 425, with a bottom of the solar panel assembly 100 resting at or on certain of the angle seats 422 so as to position the solar panel assembly 100 at the desired angle. In the illustrated embodiments, the angle seats 422 are arranged in pairs, with each pair being usable to variably position the solar panel assembly 100 at different angles (e.g., 30 degrees, 45 degrees, 60 degrees, etc.). It should be appreciated that, in various embodiments, the angle seats 422 can be arranged in any suitable fashion in support of any suitable number of panel angles without deviating from the scope of the present disclosure. In some embodiments, the case front 427 can include external binding 424 (e.g., herringbone).

Figure 5:
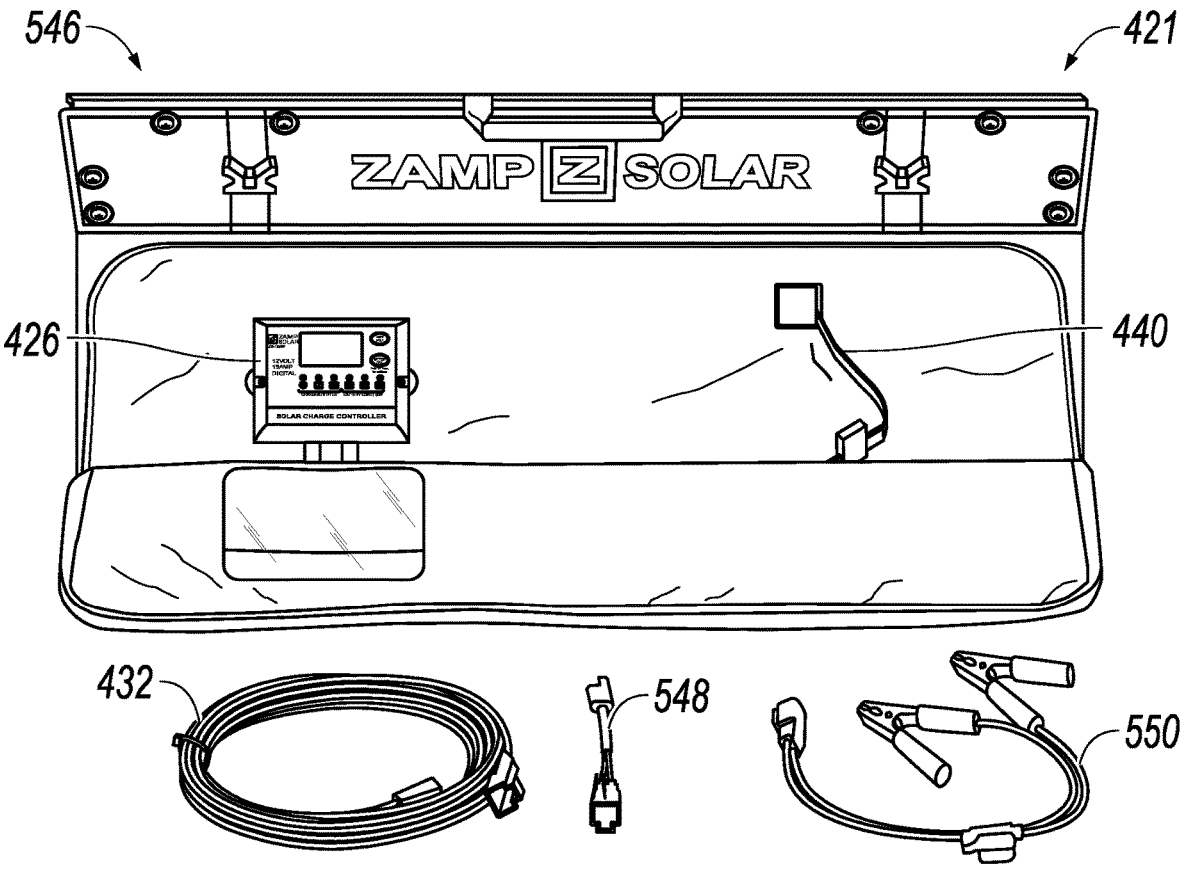
FIG. 5 illustrates a portable solar system.

FIG. 5 illustrates a portable solar system 546 that is similar to the portable solar system 446 of FIGS. 4A-C. The portable solar system 546 includes the case 421, the solar charge controller 426, the battery cord 432, an ATP interconnect 548 that is usable with the solar charge controller 426, and an ATP to battery clamps assembly 550.

Figures 6A, 6B, 6C:
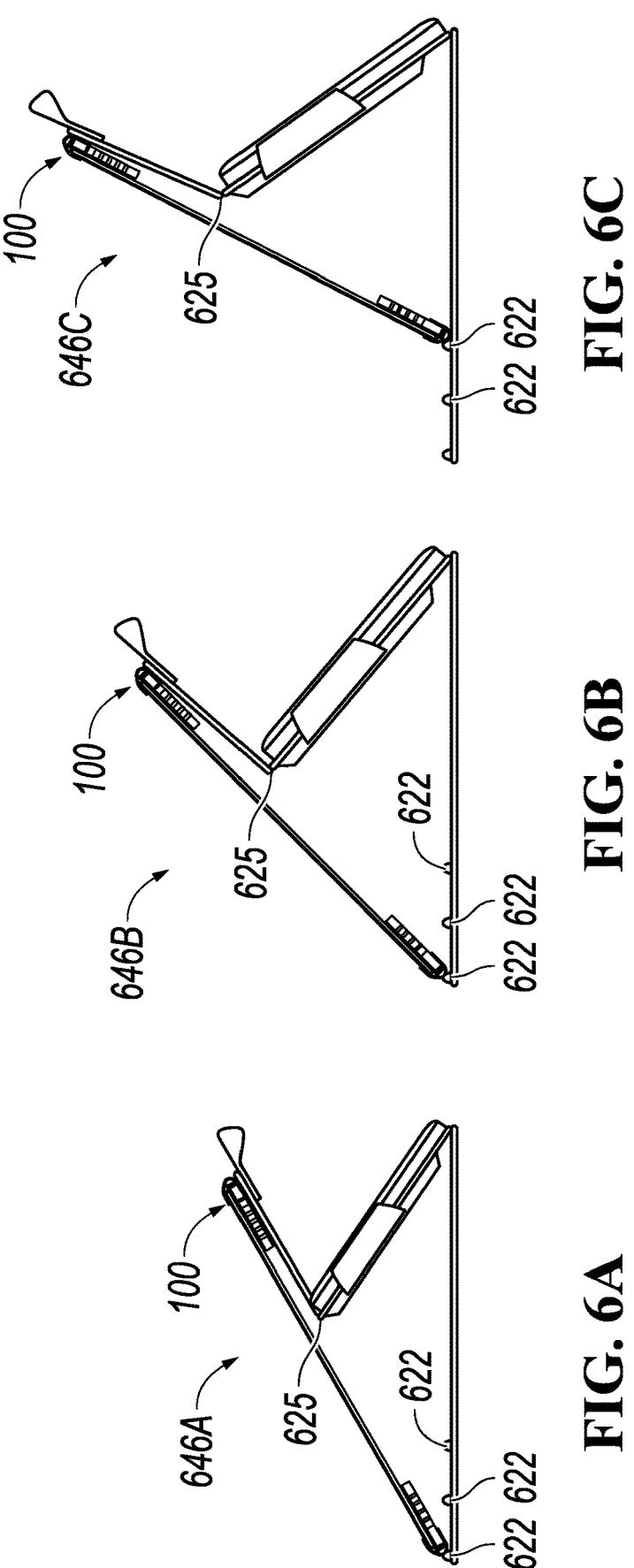
FIG. 6A illustrates a deployment configuration of a portable solar system.
FIG. 6B illustrates a deployment configuration of a portable solar system.
FIG. 6C illustrates a deployment configuration of a portable solar system.

FIGS. 6A-C are side views of different deployment configurations of portable solar systems similar to the portable solar systems 446 and 546 of FIGS. 4A-C and 5, respectively. FIGS. 6A, 6B, and 6C illustrate deployment configurations of portable solar systems 646A, 646B, and 646C, respectively. The portable solar systems 646A, 646B, and 646C each include the solar panel assembly 100 described previously, an adjustable hinge 625 similar to the hinge 425 of FIGS. 4A-C, and an arrangement of angle seats 622. Each of the angle seats 622 may correspond to a pair or more of such angle seats as described relative to the angle seats 422 of FIGS. 4A-C. In each of the portable solar systems 646A, 646B, and 646C, the angle seats 622, potentially in combination with appropriate adjustment of the adjustable hinge 625, result in positioning of the solar panel assembly 100 at a desired angle relative to the sun. The desired angle may be, for example, approximately 30 degrees, 45 degrees, 60 degrees, or another suitable angle.

Figure 7A:
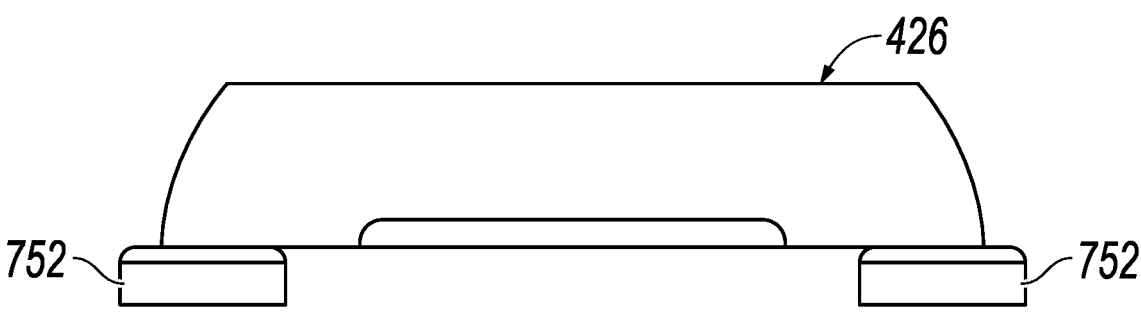
FIG. 7A illustrates a cross-sectional view of a solar charge controller.
Figure 7B:
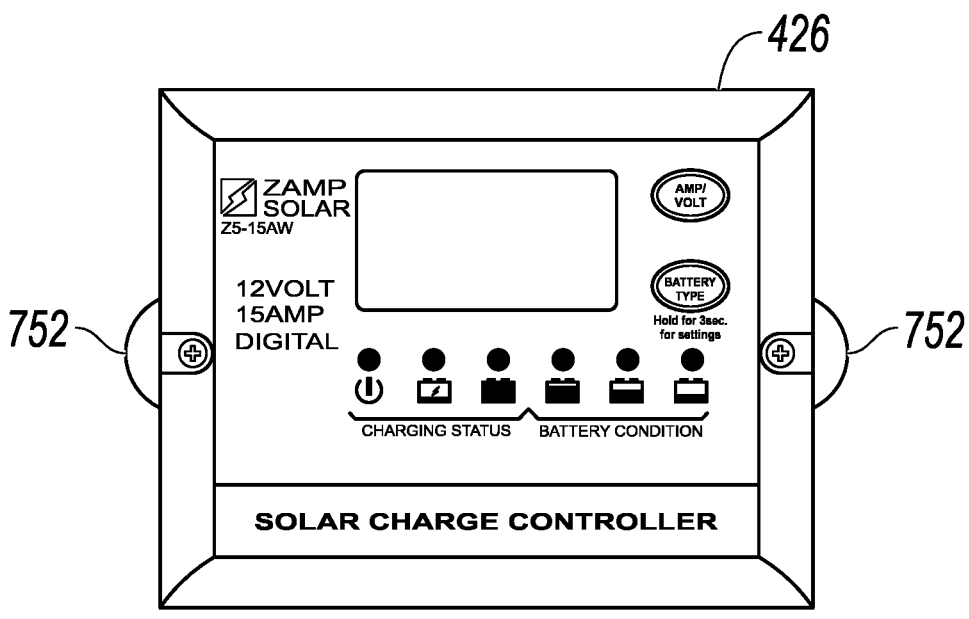
FIG. 7B illustrates a top view of a solar charge controller.

FIGS. 7A-B illustrate the solar charge controller 426. FIG. 7A shows a cross-sectional view of the solar charge controller 426, while FIG. 7B shows a top view of the solar charge controller 426. In the illustrated embodiment, two magnets 752 are affixed to opposite sides of a bottom of the solar charge controller 426. In various embodiments, the magnets 752 facilitate magnetic mounting of the solar charge controller to the inside of a storage pocket as described previously.

Figure 8A:
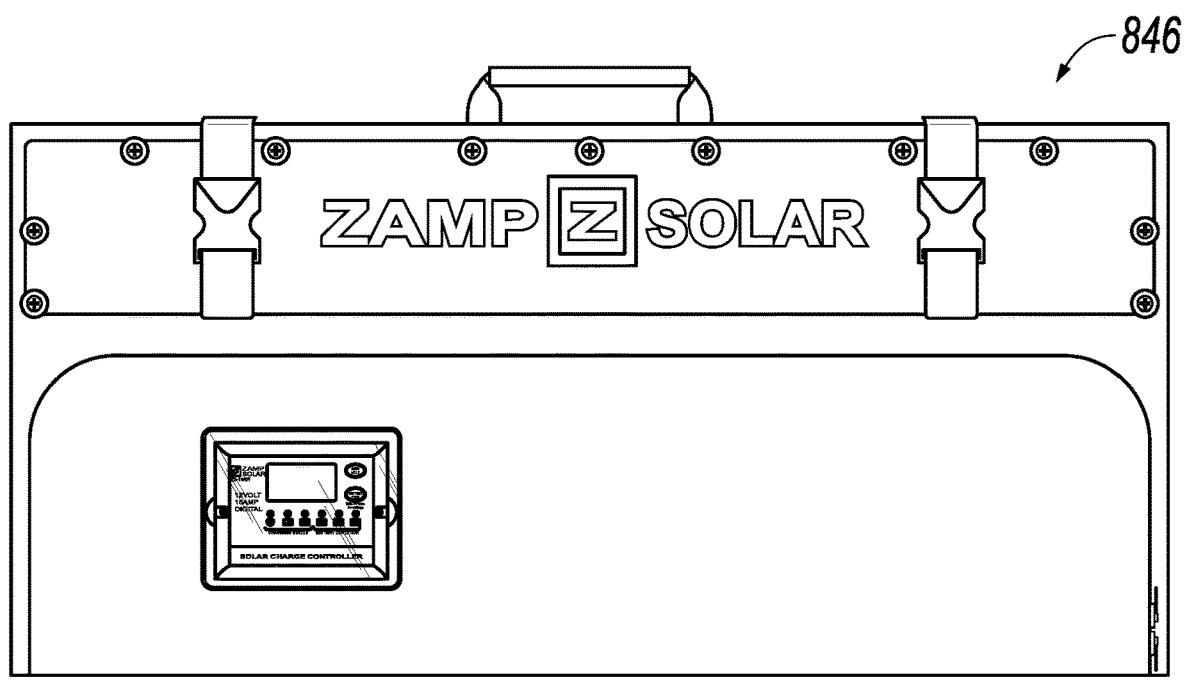
FIG. 8A illustrates a front view of a portable solar system in a closed, or non-deployed, configuration.
Figure 8B:
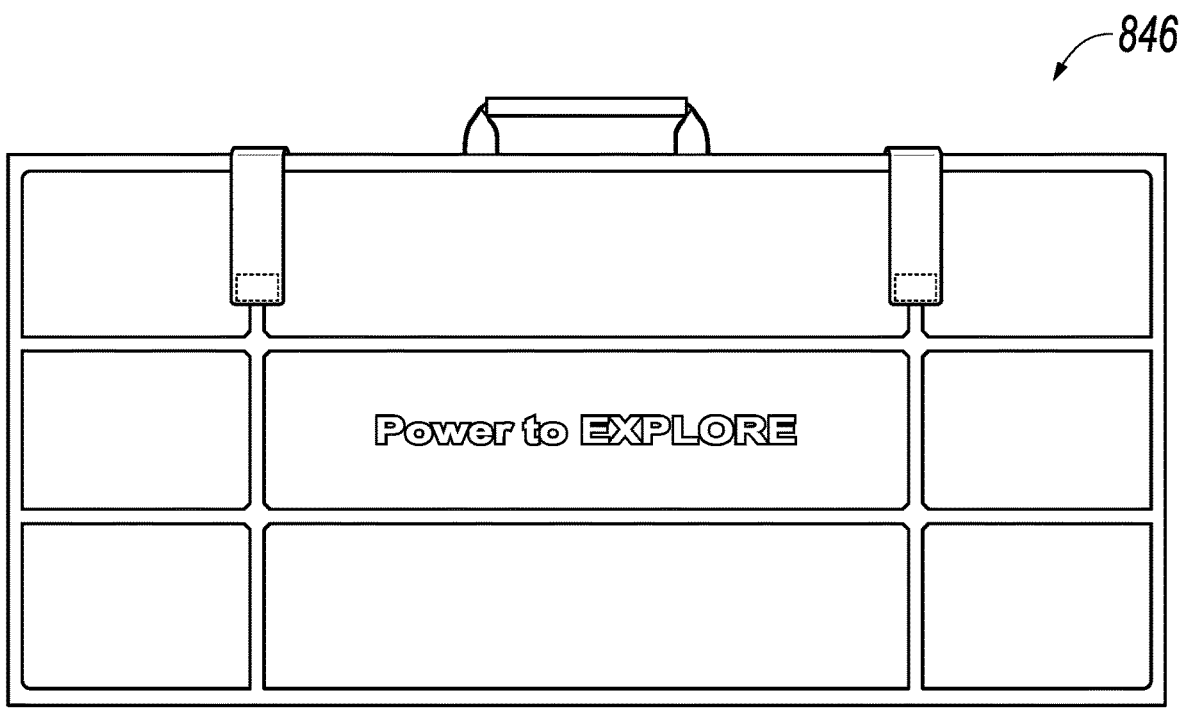
FIG. 8B illustrates a back view of the portable solar system of FIG. 8A.

FIGS. 8A-B illustrate front and back views of a portable solar system 846 in a closed, or non-deployed, configuration. In various embodiments, the portable solar system 846 can correspond to any of the portable solar systems described relative to FIGS. 4A-C, 5, and 6A-C.

Figure 9:
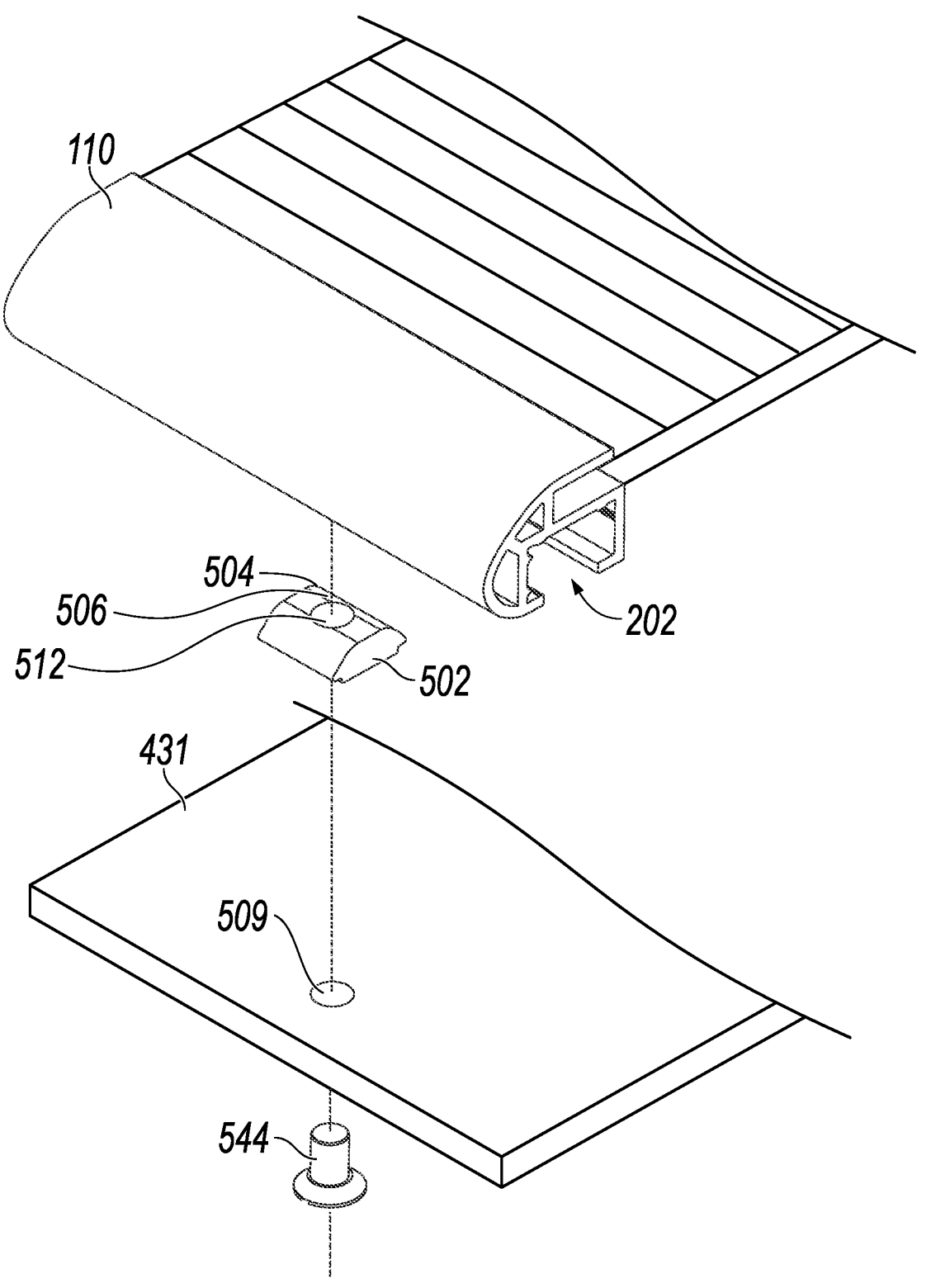
FIG. 9 illustrates attachment of a solar panel assembly to a case.

FIG. 9 illustrates attachment of the solar panel assembly 100 to the case 421 of FIGS. 4A-C. In particular, FIG. 9 is an exploded perspective view of the frame member 110 of the solar panel assembly 100 and the panel attachment section 431 of the case 421. For clarity of illustration, the frame member 110 is shown in cross-section. In various embodiments, a T-nut 502 is received into the channel 202 of the frame member 110. The T-nut 502 includes a spring member 504 that extends upwardly from a top surface 506 of the T-nut 502. When assembled, the spring member 504 engages the interior of the channel 202 and increases friction between the T-nut 502 and the channel 202, thereby reducing the likelihood of inadvertent movement of the T-nut 502 within the channel 202. The panel attachment section 431 is coupled to the T-nut 502 via a fastener 544 that is received through an aperture 509 formed in the panel attachment section 431. The fastener 544 may be one of the fasteners 444 described relative to FIGS. 4A-C. In various embodiments, the fastener 544 is a threaded fastener such as, for example, a screw or bolt that engages a threaded aperture 512 formed in the T-nut 502. However, in other embodiments, the fastener 544 may be a non-threaded fastener such as, for example, a rivet, a friction pin, or other fastener that secures the spacer 508 to the T-nut 502. In various embodiments, the aperture 509 is representative of a plurality of such apertures formed in the panel attachment section in correspondence to the fasteners 444 shown in FIGS. 4A-C. Accordingly, the foregoing procedure may be repeated for each of the fasteners 444 shown in FIGS. 4A-C. When assembled, the panel attachment section 431 is flush against a bottom aspect of the channel 202 and extends laterally from the frame member 110, thereby attaching the solar panel assembly to the case 421.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within a percentage of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A case attachment assembly for a solar panel, the case attachment assembly comprising:
   a frame member having a channel formed therein;
   a T-nut that is received into and slidably disposed within the channel, the T-nut including:
      a top surface; and
      a spring member extending upwardly from the top surface and engaging an interior of the channel;
   a case comprising a panel attachment section, the panel attachment section being positioned flush against a bottom aspect of the channel and extending laterally from the frame member; and
   a fastener separate from the T-nut, wherein the fastener is received through an aperture formed in the panel attachment section and engaging a threaded aperture formed in the T-nut to couple the panel attachment section to the T-nut.

2. The case attachment assembly of claim 1, wherein the fastener is at least one of a screw, bolt, rivet, or friction pin.

3. The case attachment assembly of claim 1, wherein the frame member comprises a notch defined, at least in part, by the channel and an arcuate member.

4. The case attachment assembly of claim 3, wherein the notch is configured for solar panel receipt and retention via friction.

5. The case attachment assembly of claim 4, wherein the case comprises:
   a case front; and
   a case back movably attached to the case front at a first hinge and configured for solar-panel attachment via a plurality of apertures therein.

6. The case attachment assembly of claim 5, wherein the case front comprises one or more angle seats on an interior side thereof, the one or more angle seats enabling angled solar-panel positioning.

7. The case attachment assembly of claim 5, wherein:
   the case front comprises an arrangement of angle seats on an interior side thereof; and
   the arrangement of angle seats enables variable solar-panel positioning at a plurality of angles.

8. The case attachment assembly of claim 7, wherein the plurality of angles is selected from the group consisting of: approximately 30 degrees, approximately 45 degrees, and approximately 60 degrees.

9. The case attachment assembly of claim 5, wherein the case back further comprises a storage pocket that is accessible from an exterior side of the case.

10. The case attachment assembly of claim 9, wherein the case back comprises:
   a first back section having the plurality of apertures and configured for solar-panel attachment; and
   a second back section movably attached to the first back section at a second hinge and movably attached to the case front at the first hinge, the second back section comprising the storage pocket.

11. The case attachment assembly of claim 10, wherein the case front comprises one or more angle seats on an interior side thereof, the one or more angle seats enabling angled solar-panel positioning when the case back is folded relative to the second hinge.

12. The case attachment assembly of claim 10, wherein the storage pocket fits into negative space on an interior side of the second back section.

13. The case attachment assembly of claim 10, wherein:

the second back section comprises a pocket door that configurably encloses or exposes the storage pocket; and the pocket door comprises a window such that, when the case is closed, the window aligns with and provides visibility into at least a portion of the storage pocket.

14. The case attachment assembly of claim 13, wherein the window comprises a transparent protective cover.

15. The case attachment assembly of claim 5, the case further comprising a first handle disposed at a top of the case front and a second handle disposed at a top of the case back, wherein the first handle and the second handle magnetically attract each other so as to symmetrically clasp together when the case is closed.

16. The case attachment assembly of claim 1, wherein the case comprises:

a case front; and a case back movably attached to the case front and including the panel attachment section.

17. A case attachment assembly for a solar panel, the case attachment assembly comprising:

a frame member having a channel formed therein;

a plurality of T-nuts that are received into and slidably disposed within the channel, each T-nut including:

a top surface; and a spring member extending upwardly from the top surface and engaging an interior of the channel;

a plurality of fasteners; and a case comprising:

a case front; and a case back movably attached to the case front and comprising a panel attachment section having a plurality of apertures formed therein, wherein the panel attachment section is flush against a bottom aspect of the channel and extends laterally from the frame member, and wherein the case back is coupled to the plurality of T-nuts via receipt of the plurality of fasteners through the plurality of apertures and into threaded apertures formed in the plurality of T-nuts.

18. The case attachment assembly of claim 17, wherein the case back comprises:

a first back section comprising the panel attachment section and having the plurality of apertures formed therein, the first back section being configured for solar-panel attachment; and a second back section movably attached to the case front at a first hinge and movably attached to the first back section at a second hinge.

* * * * *